United States Patent [19]
Dam et al.

[11] Patent Number: 5,700,094
[45] Date of Patent: Dec. 23, 1997

[54] BEARING ASSEMBLY HAVING IMPROVED FRETTING AND ABRASION RESISTANCE

[75] Inventors: Chuong Q. Dam, Peoria; Gregory G. Hafner, Normal; Kenneth W. Burris, Peoria, all of Ill.

[73] Assignee: Caterpillar, Inc., Peoria, Ill.

[21] Appl. No.: 591,060

[22] Filed: Jan. 25, 1996

[51] Int. Cl.$^6$ ............................................. F16C 33/30
[52] U.S. Cl. ...................... 384/569; 384/492; 384/625; 384/913
[58] Field of Search .......................... 384/492, 445, 384/625, 913, 569

[56] References Cited

U.S. PATENT DOCUMENTS 5,165,804  11/1992  Fisher et al. ........................ 384/492
5,322,735  6/1994  Fridez et al. ........................ 384/445
5,593,234  1/1997  Liston ................................. 384/492

*Primary Examiner*—Lenard A. Footland
*Attorney, Agent, or Firm*—Pankaj M. Khosla

[57] ABSTRACT

A bearing assembly comprising, an inner race, an outer race spaced apart from the inner race and a plurality of rolling elements disposed in the space between the inner race and the outer race. The rolling elements are in rolling contact with the inner and outer races. An abrasion resistant coating is deposited on at least one of the inner race and the outer race. The coating is selected from the group consisting of metallic nitrides, metallic carbonitrides, and mixtures thereof.

10 Claims, 1 Drawing Sheet

Fig_1_
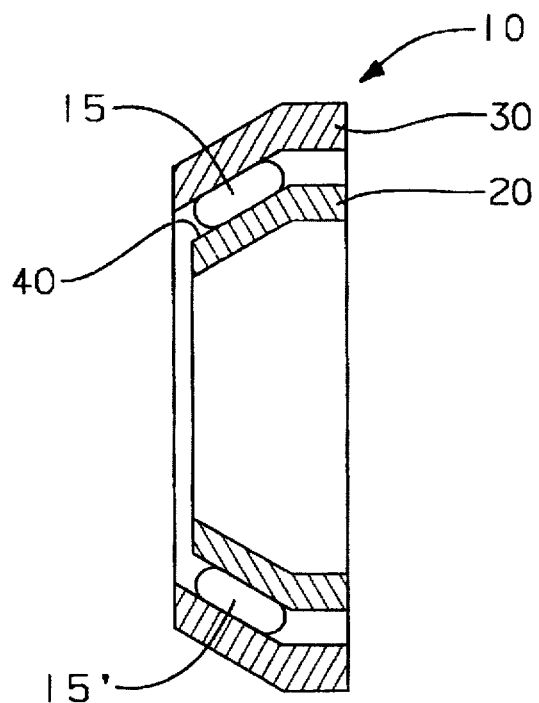
Fig_2_
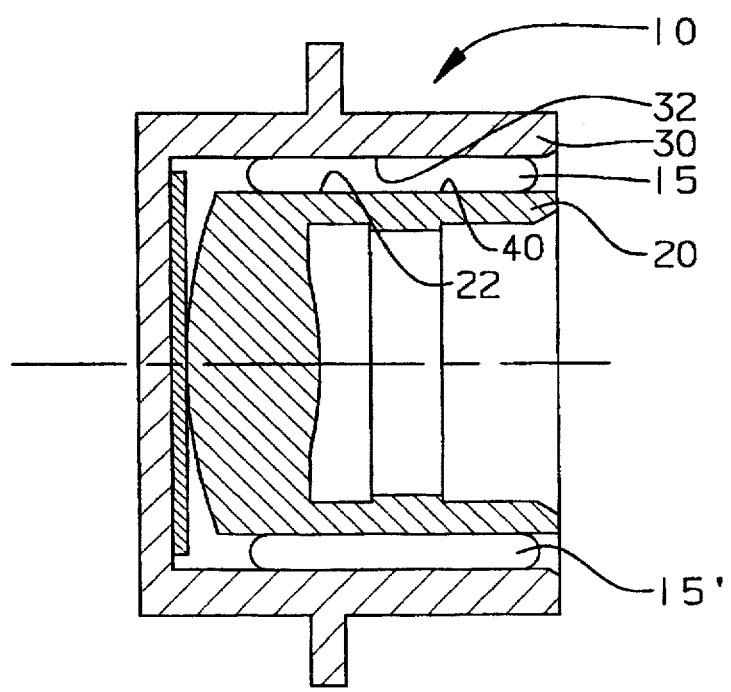

5,700,094

1

BEARING ASSEMBLY HAVING IMPROVED FRETTING AND ABRASION RESISTANCE

TECHNICAL FIELD

The present invention relates generally to bearing assemblies, and more particularly to a bearing assembly having coated raceways for improved fretting and wear resistance.

BACKGROUND ART

In an axial piston pump, needle bearings are used for supporting the swash plate or the yoke of the pump. Such needle bearings are located at the end of the yoke and allow the yoke to rotate to and from and change the stroke of the piston. In the operation of axial piston pumps, the needle bearings are subjected to primarily an oscillating motion, rather than a rotational motion. This oscillating motion causes fretting of the raceways or false brinelling of the bearing assemblies, leading to premature failure of the bearings and consequently, a failure of the pump. This results in undesirable downtime, leading to a waste of time, labor and resources while the pump is being rebuilt.

In applications where such axial piston pumps are used to pump engine oil or hydraulic oil, any contaminants in the oil, such as dirt or soot for example, accelerate the fretting and wear of the pump bearings. It has been observed that the fretting and wear occur on the raceways of such bearings because of the combined effect of the oil contaminants and poor oil film formation between the raceway and the needles in the bearing assembly, due to the non-rotational, or oscillating motion of the bearings.

It is desirable to improve the wear resistance of the raceways of such bearing assemblies. It is also desirable to improve the surface finish of the raceways so that they are more resistant to wear. It is further desirable to coat the raceways with a wear resistant material that would significantly decrease fretting of the raceways.

The present invention is directed to overcome one or more problems of heretofore utilized bearing assemblies.

DISCLOSURE OF THE INVENTION

In one aspect of the present invention, a bearing assembly is disclosed. The bearing assembly comprises, an inner race, an outer race spaced apart from the inner race and a plurality of rolling elements disposed in the space between the inner race and the outer race. The rolling elements are in rolling contact with the inner race and the outer race. An abrasion resistant coating is deposited on at least one of the inner race and the outer race. The coating is selected from the group consisting of metallic nitrides, metallic carbonitrides, and mixtures thereof.

In another aspect of the present invention, an improvement in a bearing assembly is disclosed. Such a bearing assembly has an inner race, an outer race spaced apart from the inner race, and a plurality of rolling elements disposed in the space between the inner and outer races, the rolling elements being in rolling contact with the inner and outer races, and the races being subjected to an oscillating motion with respect to one another. The improvement comprises, depositing an abrasion resistant coating on at least one of the inner race and the outer race, and increasing the fretting wear resistance of the bearing assembly having the coating by a magnitude of at least five times as compared with the fretting resistance of a similar bearing assembly without the coating.

2

In yet another aspect of the present invention, a needle bearing assembly for an axial piston pump is disclosed. The needle bearing assembly comprises, an inner race having a first planar surface and an outer race having a second planar surface. The outer race is spaced apart from the inner race. A plurality of rolling elements are disposed in the space between the inner race and the outer race. The rolling elements are in oscillatory rolling contact with the first planar surface and the second planar surface. An abrasion resistant coating is deposited on at least one of the first planar surface and the second planar surface. The coating has a thickness in the range of about 0.001 mm to about 0.01 mm.

BRIEF DESCRIPTION OF THE DRAWINGS

FIG. 1 is a sectional side view of one embodiment of the bearing assembly of the present invention; and FIG. 2 is a sectional side view of the preferred embodiment of the needle bearing assembly according to the present invention.

BEST MODE FOR CARRYING OUT THE INVENTION

Referring to FIG. 1, a bearing assembly 10 is shown. The bearing assembly comprises an inner race 20, an outer race 30 spaced apart from the inner race 20, and a plurality of rolling elements 15,15' disposed in the space between the inner race 20 and the outer race 30. The rolling elements 15,15' are in rolling contact with the inner race 20 and the outer race 30. An abrasion resistant coating 40 is deposited on at least one of the inner race 20 and the outer race 30, and preferably, on both the inner race 20 and the outer race 30. The coating 40 is selected from the group consisting of metallic nitrides, metallic carbonitrides, and mixtures thereof.

In the preferred embodiment of the present invention, the coating 40 has a thickness desirably in the range of about 0.001 mm to about 0.01 mm, and preferably, about 0.002 mm. A thickness less than 0.001 mm is undesirable because the coating tends to wear too soon. A thickness greater than 0.01 mm is undesirable because the coating can spall, resulting in premature wear.

In the preferred embodiment of the present invention, the coating 40 is desirably, selected from one of metallic nitrides and metallic carbonitrides. Even more desirably, the coating 40 is selected from one of titanium nitride, titanium carbonitride, chromium nitride, chromium carbonitride, zirconium nitride and zirconium carbonitride, and preferably, chromium nitride.

In the preferred embodiment of the present invention, the rolling elements 15,15' are in oscillatory rolling contact with the inner race 20 and the outer race 30. It has been observed that the wear of the raceway due to "false brinelling" is particularly severe when the bearing is subjected to oscillating type motion. Hence, the increase in the service life of these bearings before failure due to false brinelling is particularly appreciable when such bearing races are coated according to the preferred embodiment of the present invention.

The coating is deposited desirably, by any one of the vapor deposition techniques, such as physical vapor deposition, chemical vapor deposition and arc vapor deposition. In the preferred embodiment of the present invention, the chromium nitride coating 40 is deposited by arc vapor deposition process which comprises the following steps: An arc source is provided. The arc source is adapted to impart a positive charge on the vapor generated. A negative bias voltage of about 50 volts is applied to the race substrate by a voltage source. A vapor deposition coating 40 is deposited on the race substrate. Such coating methods are well known to those skilled in the art of vapor deposition coating.

However, during arc vapor deposition, macroparticles are often produced in the vapors and these macroparticles may detrimentally affect the coating surface. Thus as an alternative, the above process may be improved in order to reduce the amount of macroparticles in the coating, by providing a metallic wire mesh, preferably stainless steel having a preselected opening size desirably in the range of about 0.22 mm to about 0.86 mm, and preferably, of about 0.47 mm. The wire mesh is positioned in between the arc source and the race substrate to be coated, say, the inner race 20 for example, preferably at a distance of at least 15 mm from the inner race 20. A negative bias voltage of about 50 volts is applied to the wire mesh by a voltage source. The arc source provides a current in the range of about 50 Amps to about 250 Amps and imparts a positive charge on the macroparticles present in the vapor generated. The positively charged macroparticles are entrapped on the negatively biased wire mesh.

The bearing assembly can be any one of the various types known to those skilled in the art, such as for example, tapered bearing, needle bearing and the like.

In another embodiment of the present invention, an improvement in a bearing assembly which is primarily subjected to oscillating motion, is disclosed. Referring to FIG. 1 again, such a bearing assembly 10 has an inner race 20, an outer race 30 spaced apart from the inner race 20, and a plurality of rolling elements 15,15' disposed in the space between the inner and outer races 20,30 respectively, the rolling elements 15,15' being in rolling contact with the inner and outer races 20,30 respectively, and the races 20,30 being subjected to an oscillating motion with respect to one another. The improvement comprises, depositing an abrasion resistant coating 40 on at least one of the inner race 20 and the outer race 30, and increasing the fretting wear resistance of the bearing assembly 10 having the coating 40 by a magnitude of at least five times as compared with the fretting resistance of a similar bearing assembly without the coating.

In the preferred embodiment of the present invention, the abrasion resistant coating 40 of the bearing assembly 10 is selected desirably, from one of metallic nitrides and metallic carbonitrides. Even more desirably, the coating 40 is selected from one of titanium nitride, titanium carbonitride, chromium nitride, chromium carbonitride, zirconium nitride and zirconium carbonitride, and preferably, chromium nitride. The chromium nitride coating is deposited desirably, by any one of the vapor deposition techniques, such as physical vapor deposition, chemical vapor deposition and arc vapor deposition. In the preferred embodiment of the present invention, the coating 40 is deposited by arc vapor deposition process.

In the preferred embodiment, the bearing assembly having the wear resistant coating exhibits improved fretting resistance particularly when the bearing oscillates in the range of about +/−7.5 degrees about a median point.

In yet another embodiment of the present invention, a needle bearing assembly for an axial piston pump is disclosed. Referring to FIG. 2, the needle bearing assembly 10 comprises, an inner race 20 having a first planar surface 22 and an outer race 30 having a second planar surface 32. The outer race 30 is spaced apart from the inner race 20. A plurality of rolling elements 15,15' are disposed in the space between the inner race 20 and the outer race 30. The rolling elements 15,15' are in oscillatory rolling contact with the first planar surface 22 and the second planar surface 32. An abrasion resistant coating 40 is deposited on at least one of the first planar surface 22 and the second planar surface 32. The coating 40 has a thickness in the range of about 0.001 mm to about 0.01 mm.

EXAMPLE A

The inner race of a needle bearing assembly for an axial piston pump used for pumping engine oil, was coated with a chromium nitride coating of about 0.002 mm by arc vapor deposition, according to the present invention. The arc source was positioned at a distance of 100 mm from the race substrate. The arc source was energized with a current of 75 Amps. A negative bias voltage of 50 volts was applied to the race substrate. A chromium nitride coating having a thickness of about 0.002 mm (2 µm) was deposited on the steel race substrate.

The coated bearing assembly and a non-coated bearing assembly of same size and shape were installed in an axial piston pump pumping 50% by volume new 15W40 oil and 50% by volume reclaimed 15W40 oil. Oil temperature was about 200° F. The pump was tested in a rapid cycle endurance test with the following cycle parameters: Position 1; 0.125 seconds at 8 gallons/min oil flow rate at 1350 psi oil pressure, and Position 2; 0.125 seconds at 13 gallons/min oil flow rate at 3625 psi oil pressure.

It was observed that after 40 hours of testing, the bearing assembly having non-coated races "false brinelied". False brinelling is a condition familiar to those skilled in the art and it represents the point in time when the surface of the raceway material begins to wear under the pressure of the highly loaded bearings, resulting in a shallow indentation and indicating the beginning of detrimentally excessive wear. Typically, false brinelling is indicated when the race surface has a shallow abrasive wear in a very localized area, such that the race surface appears to have been indented or impacted by the bearing needles or rollers.

In marked contrast, it was observed that under the same conditions, the bearing assembly having coated races according to the present invention ran for 250 hours without "false brinelling". In coated raceways, false brinelling is indicated by the moving or smearing of the coating on the race substrate under the pressure of the highly loaded bearings, and a shallow indentation. Thus the bearing assembly of this invention exhibited improved durability by running for a period at least six times longer than the non-coated bearings. Hence it is concluded that the bearing assembly according to the preferred embodiment of the present invention, having chromium nitride coated races exhibits at least about 6 times greater wear and fretting resistance than its non-coated counterpart.

Industrial Applicability

The present invention is particularly useful for improving the fretting and wear resistance of bearings subjected to oscillating motion. In severe applications, such as when needle bearings are used in axial piston pumps used for pumping engine oil having contaminants, the present invention increases the useful service life of such bearings by a factor of at least five times. This invention thus represents a savings of time, labor, and resources for the bearings industry.

Other aspects, objects and advantages of this invention can be obtained from a study of the drawings, the disclosure and the appended claims.

We claim:

1. A needle bearing assembly for an axial piston pump, comprising:

an inner race having a first planar surface;

an outer race having a second planar surface, said outer race being spaced apart from said inner race;

a plurality of rolling elements disposed in the space between said inner race and said outer race, said rolling elements being in oscillatory rolling contact with said first planar surface and said second planar surface; and an abrasion resistant coating deposited on at least one of said first planar surface and said second planar surface, said coating being one of chromium nitride, chromium carbonitride, or mixtures thereof, and said coating having a thickness in the range of about 0.001 mm to about 0.01 mm.

2. A needle bearing assembly, as set forth in claim 1, wherein said abrasion resistant coating is chromium nitride.

3. A bearing assembly comprising:

an inner race;

an outer race spaced apart from said inner race;

a plurality of rolling elements disposed in the space between said inner race and said outer race, said rolling elements being in rolling contact with said inner race and said outer race; and an abrasion resistant coating deposited on at least one of said inner race and said outer race, said coating being one of chromium nitride, chromium carbonitride, or mixtures thereof, said coating having a thickness in the range of about 0.001 mm to about 0.01 mm.

4. A bearing assembly, as set forth in claim 3, wherein said abrasion resistant coating is of chromium nitride.

5. A bearing assembly, as set forth in claim 3, wherein said rolling elements are in oscillatory rolling contact with said inner race and said outer race.

6. A bearing assembly, as set forth in claim 3, wherein said abrasion resistant coating is deposited by vapor deposition techniques.

7. A bearing assembly, as set forth in claim 6, wherein said coating has a thickness of about 0.002 mm.

8. In a bearing assembly having an inner race, an outer race spaced apart from said inner race, and a plurality of rolling elements disposed in the space between said inner and outer races, said rolling elements being in rolling contact with said inner and outer races, said races being subjected to an oscillating motion with respect to one another, the improvement, comprising:

depositing on at least one of said inner race and said outer race, an abrasion resistant coating, said coating being one of chromium nitride, chromium carbonitride, or mixtures thereof; and increasing the fretting wear resistance of said bearing assembly having said coating by a magnitude of at least five times as compared with the fretting resistance of a similar bearing assembly without said coating, said coating having a thickness in the range of about 0.001 mm to about 0.01 mm.

9. In a bearing assembly, as set forth in claim 8, the improvement wherein said abrasion resistant coating is of chromium nitride.

10. In a bearing assembly, as set forth in claim 8, the improvement wherein said abrasion resistant coating is deposited by arc vapor deposition.

* * * * *